W. E. CALKINS.
RESILIENT TIRE.
APPLICATION FILED NOV. 25, 1916.

1,246,713.

Patented Nov. 13, 1917.

Witnesses
Hugh H. Ott
P. M. Smith

Inventor
W. E. Calkins,
By Victor J. Evans
Attorney

UNITED STATES PATENT OFFICE.

WILLIAM E. CALKINS, OF WOODWARD, OKLAHOMA.

RESILIENT TIRE.

1,246,713.  Specification of Letters Patent.  Patented Nov. 13, 1917.

Application filed November 25, 1916. Serial No. 133,437.

*To all whom it may concern:*

Be it known that I, WILLIAM E. CALKINS, a citizen of the United States, residing at Woodward, in the county of Woodward and State of Oklahoma, have invented new and useful Improvements in Resilient Tires, of which the following is a specification.

This invention relates to resilient tires and especially tires adapted for use upon the wheels of motor vehicles, the object in view being to produce a mechanically resilient tire which does away with all the troubles and annoyances incident to the use of inflated or pneumatic tires such as punctures, blow-outs and the like.

A further object in view is to produce a tire of the general character referred to embodying a novel construction and arrangement of parts whereby the tire as a whole may be maintained in a perfect working condition, the resilient tire supporting means being of sectional construction so that part may be renewed without affecting the uninjured parts thereof.

With the above and other objects in view the invention consists in the novel construction, combination and arrangement of parts, as herein described, illustrated and claimed.

In the accompanying drawing:—

Figure 1:
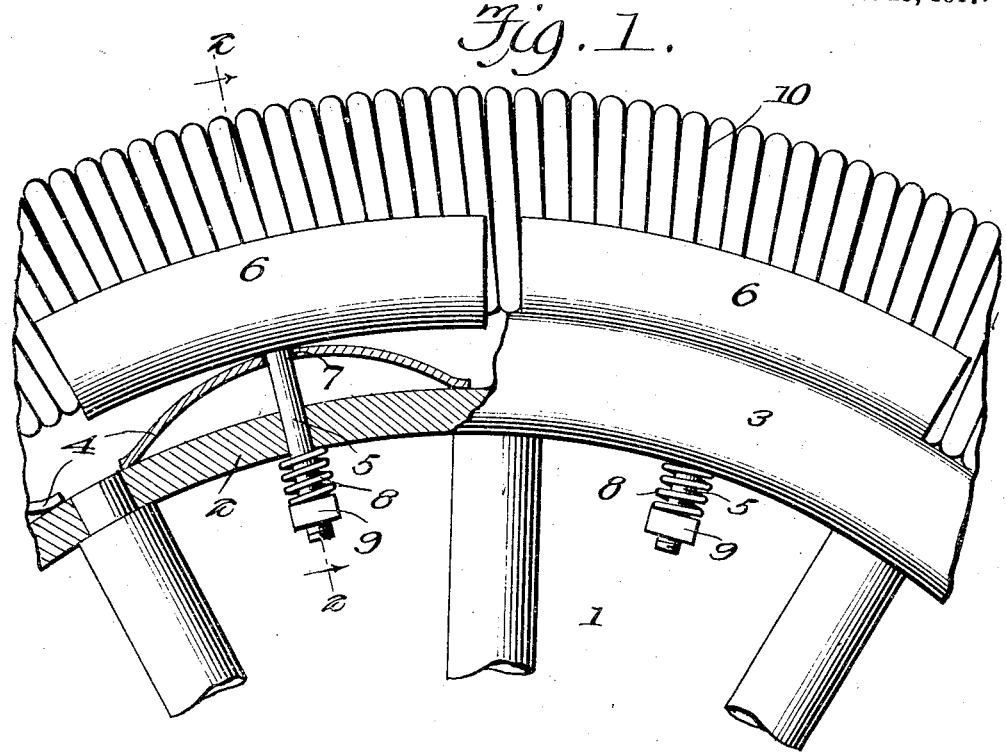
Figure 1 is a fragmentary side elevation, partly in section, of a sufficient portion of a vehicle wheel to illustrate the present invention in its applied relation thereto.
Figure 2:
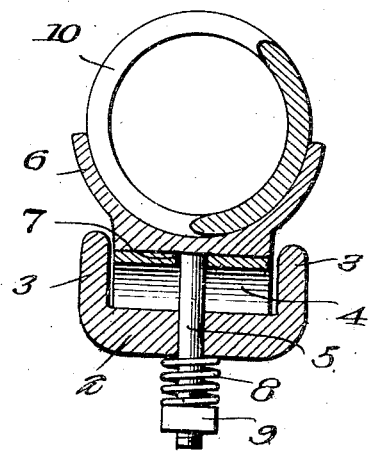
Fig. 2 is an enlarged transverse section on the line 2—2 of Fig. 1.

Referring to the drawing 1 designates generally a wheel of the ordinary construction such as is now used in connection with vehicles, the said wheel comprising a rim 2 having marginal side flanges 3 upon the outer side thereof.

In carrying out the present invention, I use in conjunction with the rim 2, an annular series of yieldable bolsters 4 each of which is preferably in the form of an arcuate spring. Each section 4 is of approximately the same width as the distance between the flanges 3 of the rim 2 thereby preventing relative lateral movement between the members 4 and said rim, the opposite extremities of each spring member 4 resting against the floor of the rim as clearly shown and sufficient space being left between the adjacent extremities of the springs to admit of the full flexibility thereof.

In the preferred embodiment of this invention, one of such springs or yieldable bolsters 4 is used for each of the spokes of the wheel, the extremities of each member 4 preferably resting against the floor of the rim adjacent to the point of junction between the spokes and the rim. Each yieldable member 4 is held against movement longitudinally of the rim by means of a bolt 5 the outer end of which bears a fixed relation to one of the series of arcuate tread supporting sections 6 each substantially semi-cylindrical in cross section and having its concaved side disposed outwardly. Each bolt 5 passes through a hole 7 in the respective yieldable member 4 and is encircled by a coiled expansion spring 8 the outer end of which bears against the inner face of the rim 2 and the inner extremity of which is held by a nut 9 threaded on the inner end portion of the bolt 5.

Encircling the entire series of supporting sections 6 is an annular tire body or tread 10 which is shown as composed of an endless coil spring the size of which in cross section corresponds with the size of the channeled outer surface of the tread supporting sections 6. If desired, the tire body or tread 10 may be attached or fastened at intervals to the tread supporting sections 6 in order to prevent the tread or body 10 from creeping longitudinally of the wheel.

The yieldable members 4 resiliently support their respective tread supporting sections 6 and the latter in turn yieldingly support the annular tire or tread 10. The outward movement of the tread supporting sections 6 is resiliently limited by means of the springs 8 and by adjusting the nuts 9, the sections 6 may be brought into true longitudinal alinement with each other. As the wheel turns under the load imposed thereon, each tread section 6 yields independently of the other tread sections and is held outwardly and returned to its normal position by means of the respective yieldable member 4. The bolts 5 prevent the members 4 and 6 from moving longitudinally of the rim 2 and together with the members 4 in their relation to the flanges 3 of the rim 2, assist in preventing lateral shifting movement of said members 4 and the tread supporting sections 6. The inner portions of the members 6 are slidable between the flanges 3 and said members 6 are thus laterally braced by said flanges.

I do not desire to be limited to the particular annular tire body or tread 10 hereinabove described and shown in the accompanying drawings as it will be apparent that the character of said member 10 may be varied according to the desire of the manufacturer. These and other changes in the form, proportion and minor details of construction may be resorted to without departing from the principle or sacrificing any of the advantages of the invention.

I claim:

The combination with a wheel rim having side flanges, of an annular series of outwardly bowed spring bolsters terminally supported by contact with said rim and prevented from lateral movement by the rim flanges, an annular series of arcuate tread supporting sections each of channeled formation and supported independently by the respective spring bolster, said tread supporting sections being slidable between said flanges, a bolt fixedly secured to each supporting section and passing through the respective spring bolster and also through the rim, an annular tread supported by said tread supporting sections, and yieldable means on said bolts for cushioning the outward movement of the tread supporting sections.

In testimony whereof I affix my signature.

WILLIAM E. CALKINS.

Copies of this patent may be obtained for five cents each, by addressing the "Commissioner of Patents, Washington, D. C."